Figures 1, 2, 3:
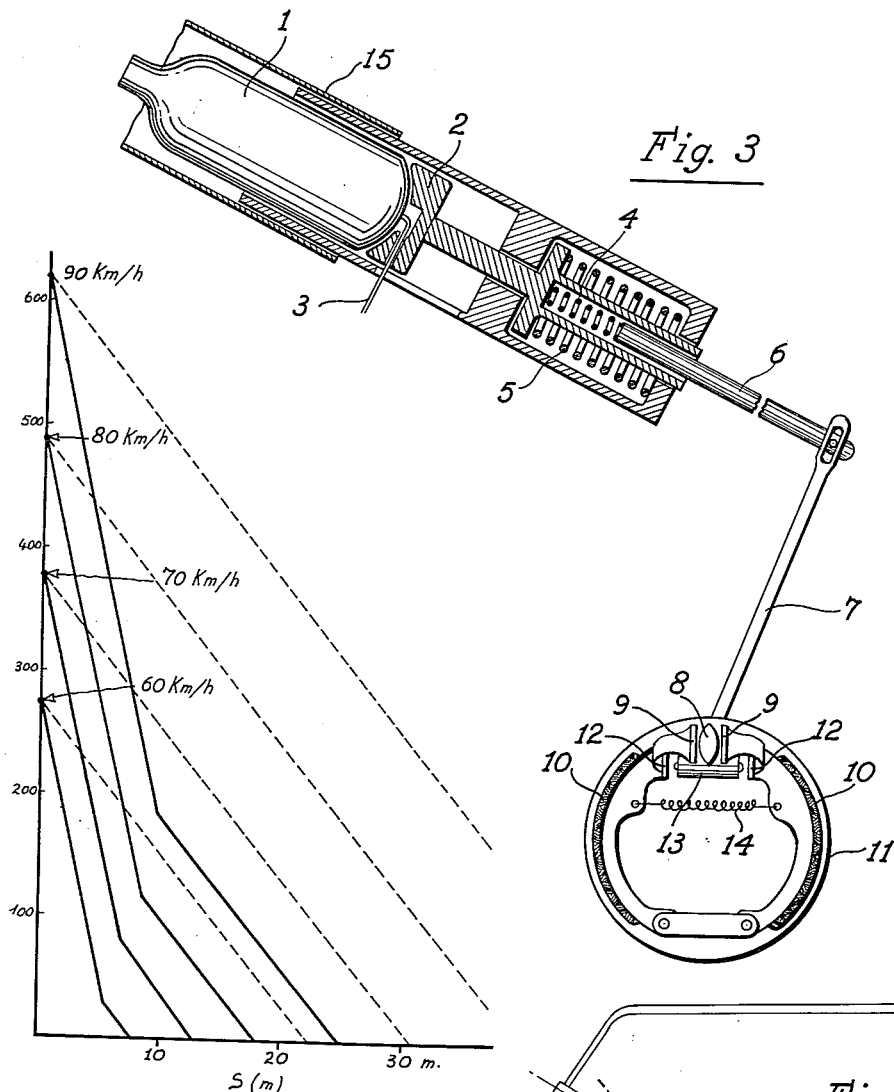

Nov. 20, 1962  G. ZIZZI  3,064,762
ROCKET EMERGENCY BRAKING DEVICE
Filed June 28, 1960

INVENTOR
GIOVANNI ZIZZI
BY Kirschstein, Kirschstein & Ottinger
ATTORNEYS

United States Patent Office 3,064,762
Patented Nov. 20, 1962

3,064,762
ROCKET EMERGENCY BRAKING DEVICE
Giovanni Zizzi, Viale Somalio 214, Rome, Italy
Filed June 28, 1960, Ser. No. 39,264
Claims priority, application Italy July 2, 1959
1 Claim. (Cl. 188—2)

This invention relates to a rocket braking device, particularly suited for use in motor-cars, to provide an additional powerful braking action to actuate in case of emergency.

The device is operated by the thrust of a rocket housed in the motor-car and arranged in such a manner as to provide a strong push in the opposite direction of the car motion.

The rocket thrust operates at the same time as the existing normal braking system of the motor-car and the emergency braking device so that the braking action will be the sum of both actions. Thus the rocket emergency braking device will shorten considerably (by about one-third) the distance required by a normal braking system to stop a motor-car.

The driver of the motor-car operates the emergency braking device through an electrically fired rocket; this rocket is set up on the centerline of the motor-car, positioned with an inclined axis to eliminate hot gas damage, and to increase its total action.

The basic operating principle is that the horizontal component of the rocket thrust decelerates the motor-car motion and the vetrical component of the rocket thrust operates downward as increased load on the wheels, so that braking action on the wheels will be proportionally increased.

In the drawings:

FIG. 1 a schematic view of the rocket braking device embodying the invention.

FIG. 2 shows diagrammatically the kinetic energy in function of the motor-car braking run, in the case of normal braking action and in the case of the additional rocket thrust action.

FIG. 3 shows a longitudinal section view of the rocket braking device connected to a normal hydraulic braking system. The rocket braking device of the present invention is based on the following theoretical principles. Let $g$ = acceleration due to gravity
$p$ = motor-car weight
$\alpha$ = angle between the horizontal line and the axis of the rocket
$F$ = rocket thrust The rocket thrust F is resolved (FIG. 1) into its components, the horizontal component $F_0 = F \cos \alpha$ and the vertical component $F_v = F \sin \alpha$. The horizontal component $F_0$ in the opposite direction of the motor-car motion, causes a deceleration:

$$\frac{g}{P}F_0 = \frac{g}{P}F \cos \alpha$$

The vertical component $F_v$ increases the load on the motor-car wheels, which attains $$P + F_v = P + F \sin \alpha$$

if the action line of the rocket thrust falls within the rectangle containing the motor-car wheels.

Consequently, when the rocket is fired, the braking action on the wheels i.e. the normal deceleration may be increased by the ratio $$\frac{P + F \sin \alpha}{P}$$

So a normal deceleration for example of 5.8 m./sec.² will be increased to $$5.8 \frac{P + F \sin \alpha}{P} \text{ m./sec.}^2$$

The increased braking action on the wheels and the horizontal component of the rocket thrust provide the additional deceleration $$D_t = \frac{g}{P}F \cos \alpha + 5.8 \frac{(P + F \sin \alpha)}{P} \text{ m./sec.}^2$$

The angle $\alpha$ has its best value when the total deceleration $D_t$ is maximum; this best $\alpha$ angle value is about 30° in the case of the example of FIG. 1. However $\alpha$ angles, not quite different from 30°, will cause also an efficient rocket braking action.

From the decelartion $D_t$ formula it may be calculated for example that a rocket thrust F of 1,500 kg. causes a total deceleration $D_t$ of about 23 m./sec.² on a motor-car having a weight P of 1000 kg. with an angle $\alpha$ of 30°.

FIG. 2 diagram compares the kinetic energy $V^2$ both in function of the motor-car braking run S as a normal braking action (dash lines) and as a rocket thrust action (full lines) for various speeds of the motor-car.

Said dash and full lines are on the basis of a 0.5 second rocket thrust F of 1,500 kg. applied to a 1000 kg. P weight motor-car.

It appears evident the great advantage of the rocket braking device, of this invention which lessens (FIG. 2) to about one-third the stop distance run S of the motor-car obtained by the normal brake system.

For the same stop distance run S the kinetic energy $V^2$ is lessened to about one fourth by the action of the rocket thrust.

The safety of a motor-car depends more often upon the kinetic energy than the stop distance run.

FIG. 3 shows a normal hydraulic braking system, which has been modified to be connected to the rocket device.

The driver of the motor-car fires the rocket 1 through the electrical cable 3; the rocket thrust pushes the cup 2 against the spring 4 and 5.

The rod 6, through the lever 7, actuates the rotation of the cam 8, which opens the two plates 9, pushing the two linings 10 against the brake drum 11 of the wheel with a ratio pressure greater by $$\frac{P + F \sin \alpha}{P}$$

than the normal hydraulic pressure.

To this braking action on the wheels will be added to the action of the horizontal component $F_0$ of the rocket thrust F. Normally the FIG. 3 device is operated through the usual hydraulic braking system on which the hydraulic pressure operates the actuating cylinder 13, which opens the two plates 12, pushing the two linings 10 against the brake drum 11 of the wheel.

As soon as the rocket propellant is burned, the spring 5 draws back the cup 2, unloading the spring 4, so that the spring 14 draws to the center of the brake drum 11 the linings 10.

Thus the rocket braking device has maximized its emergency action. The rocket braking device may be also used as a safety braking system in the case of failure of the normal hydraulic braking system.

In this event the total deceleration $D_t$ is not lessened because the linings 10 are also mechanically operated by the rotation of the cam 8.

The rocket 1 is set up (FIG. 1) close to the motor-car floor, at the longitudinal center section.

The action line of the rocket thrust F passes close to the motor-car center of gravity, to eliminate troublesome torques during the rocket firing.

A light pipe 15 carries out the exhaust gases of the rocket.

The rocket 1 may be easily changed and primed again.

The invention has been described above only for purposes of a preferential embodiment. Other manners and arrangements of parts may be easily planned, ever remaining in the limits of the invention.

What I claim is:

A rocket emergency braking device for a wheeled automotive vehicle having a braking system operable on the wheels thereof and which braking system includes a friction brake having an operating element, said rocket emergency braking device comprising a rocket arrangement operable at the same time as the wheel braking system and mounted on the vehicle with the rocket exhaust extending forwardly and upwardly along a single line between the wheels of the vehicle so as to exert a reaction force rearwardly and downwardly along a sloped action line which meets the ground within the area defined by the wheels of the vehicle whereby the horizontal component of the reaction force acts to decelerate the vehicle and the vertical component of the reaction force acts to increase the load on the wheels of the vehicle as they are decelerated by the wheel braking system, said device further including a movable member positioned to be pressed by the rocket when the rocket is energized and a kinematic train interconnecting said movable member and the operating element of the friction brake so that the reaction force of the rocket applies force to the friction brake.

References Cited in the file of this patent

UNITED STATES PATENTS

| | | |
|---|---|---|
| 1,611,353 | Lepinte | Dec. 21, 1926 |
| 2,934,380 | Julier et al. | Apr. 26, 1960 |
| 2,994,563 | Ruggiero | Aug. 1, 1961 |